United States Patent [19]

Keller et al.

[11] Patent Number: 4,798,098

[45] Date of Patent: Jan. 17, 1989

[54] CONNECTION DEVICE FOR GEARSHIFT CABLE

[75] Inventors: Josef Keller; Werner Steuer, both of Schweinfurt, Fed. Rep. of Germany

[73] Assignee: Fichtel & Sachs AG, Schweinfurt, Fed. Rep. of Germany

[21] Appl. No.: 154,501

[22] Filed: Feb. 4, 1988

Related U.S. Application Data

[63] Continuation of Ser. No. 912,181, Sep. 25, 1986, abandoned, which is a continuation of Ser. No. 529,967, Sep. 7, 1983, abandoned.

[30] Foreign Application Priority Data

Sep. 9, 1982 [DE] Fed. Rep. of Germany ....... 3233433

[51] Int. Cl.⁴ ...................... G05G 1/00; G05G 11/00; F16C 1/10
[52] U.S. Cl. ......................................... 74/470; 74/489; 74/501.5 R; 74/502.6; 403/104; 403/330
[58] Field of Search .............. 74/475, 470, 489, 500.5, 74/750 B, 502.6, 501.5 R; 24/643, 647, 585, 133; 403/330, 104, 106; 474/127, 119, 121, 54, 55, 56, 57; 267/DIG. 3; 188/196 B

[56] References Cited

U.S. PATENT DOCUMENTS

| 2,731,85 | 1/1956 | Marino .......................... 74/750 B X |
|---|---|---|
| 367,140 | 7/1887 | Fuchs ............................. 24/647 X |
| 1,408,309 | 2/1922 | Saeter et al. .................. 24/647 X |
| 1,627,776 | 5/1927 | Haumerson ................... 24/647 X |
| 2,693,368 | 11/1954 | Petron ............................ 403/104 |
| 2,719,693 | 10/1955 | Penberthy ..................... 403/104 |
| 2,773,398 | 12/1956 | Swain ............................ 74/473 |
| 2,854,857 | 10/1958 | Gleasman et al. ............ 74/489 |
| 2,857,676 | 10/1958 | Schwerdhofer ............... 33/180 R |
| 2,867,812 | 1/1959 | Roth et al. .................... 24/585 X |
| 3,020,778 | 2/1962 | Davidson ...................... 74/470 X |
| 3,040,844 | 6/1962 | Holloway et al. ............ 188/196 B X |
| 3,104,559 | 9/1963 | Dotter .......................... 74/750 B X |
| 3,383,941 | 5/1968 | Nielsen et al. . |
| 3,394,614 | 7/1968 | Zeidler . |
| 3,438,283 | 4/1969 | Schwerdhofer ............... 74/750 B |
| 3,442,148 | 5/1969 | Juy ................................ 74/470 |
| 3,471,185 | 10/1969 | Parr .............................. 24/585 |
| 3,995,503 | 12/1976 | Schulz .......................... 74/750 B |
| 4,210,986 | 7/1980 | Williams ....................... 24/643 |
| 4,242,778 | 1/1981 | Kay ............................... 24/643 X |

FOREIGN PATENT DOCUMENTS

| 1005394 | 3/1957 | Fed. Rep. of Germany . |
|---|---|---|
| 2717304 | 11/1977 | Fed. Rep. of Germany . |
| 2730003 | 1/1979 | Fed. Rep. of Germany ........ 24/643 |
| 2759581 | 9/1980 | Fed. Rep. of Germany . |
| 36895 | 8/1930 | France . |
| 679038 | 8/1930 | France ........................... 188/196 B |
| 2268301 | 11/1975 | France . |
| 594380 | 1/1978 | Switzerland .................. 24/585 |
| 733167 | 7/1955 | United Kingdom ........... 74/501 F |
| 787150 | 12/1957 | United Kingdom . |
| 1227214 | 4/1971 | United Kingdom ........... 188/196 B |
| 1582796 | 1/1981 | United Kingdom . |
| 2072776 | 10/1981 | United Kingdom ........... 188/196 B |

Primary Examiner—Gary L. Smith
Assistant Examiner—Rodney M. Lindsey
Attorney, Agent, or Firm—Toren, McGeady & Associates

[57] ABSTRACT

A shifting cable assembly for the gear shift system of bicycles or the like, includes a shifting cable for connecting a manual shifter arranged in the grip zone of the bicycle user to the shift system of the rear wheel of the bicycle, a separate connection part, which is connectable to the shifting cable, being brought out from the shift point. In this shifting cable assembly there is provided a connection assembly which is designed so as to be insertable and self-retaining, on the one hand, and so as to be releasable by hand in a simple manner, on the other hand. For this purpose, there is provided a housing which is connected to the end of the shifting cable, which is taken downwards from the manual shifter, and which is equipped with a sleeve-shaped seat for the manual insertion of a connection part which is provided, for example, with detent elements and which is retained unaidedly and operationally reliably in the seat of the housing by corresponding counter detent elements.

5 Claims, 7 Drawing Sheets

CONNECTION DEVICE FOR GEARSHIFT CABLE

This is a continuation of application Ser. No. 912,181, filed Sept. 25, 1986, which is a continuation of Ser. No. 529,967, filed Sept. 7, 1983 now both abandoned.

The invention relates to a connection assembly for a shifting cable for use in a speed change system on a bicycle or the like.

Such shifting cables are used in many ways, for example on bicycles or the like (DE PS 1 005 394). In such a known case of application, the shifting cable serves for operating, for example, a gear hub by means of a manual shifter which is arranged in the grip zone of the bicycle user. The shifting cable is divided; for this purpose, there is provided between the shifting cable, which is passed downwards from the manual shifter, and the hub to be shifted a screw connection in the form of an internally threaded sleeve at the end of the shifting cable and a corresponding threaded bolt with a lock nut at the end of the small shifting chain brought out from the hub spindle. The two parts are screwed together until the tension of the shifting cable is such that the transmission of a shifter movement leads to an exact shifting operation in the hub gearing. This afore-described connection within the shifting cable has to be completely separated when the rear wheel is dismantled, in particular. During the re-assembly thereof, it is necessary not only to re-establish the screw connection but also to re-adjust the cable tension in order to bring about an exact functioning of the shifting mechanism. However, this adjustment necessitates some expenditure of time and a certain measure of technical skill. This expenditure is altogether unfavourable.

It is therefore the object of the invention to provide, inter alia, an improvement of the connection assembly in a speed change system with respect to the adjustment requirements.

The solution of this problem involves a connection or coupling unit interconnecting a first and a second pulling member. A male coupling unit is connected to one of the pulling members and is telescopically movable within the female coupling unit. Manually releasable locking means secure the male coupling unit within the female coupling unit. This construction renders possible, with an extremely simple design of the connection assembly, an easy joining thereof, any re-setting being no longer necessary. The connection assembly designed according to the invention can be used both for a hub gearing and a preferred positioned derailleur system.

The invention will hereinafter be explained in more detail with the aid of exemplified embodiments which are illustrated in the drawings in a diagrammatised fashion and in sectional views and in which:-

Figure 12:
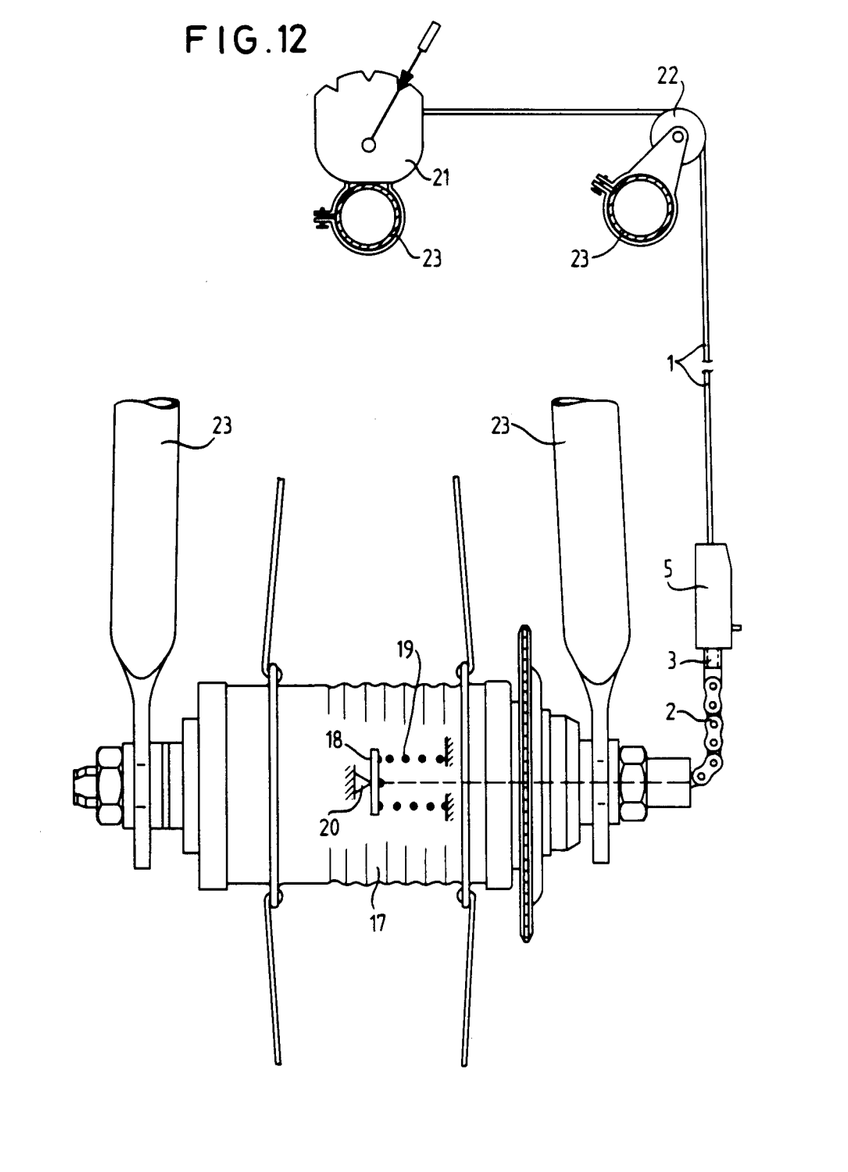
FIG. 12 shows a diagrammatical representation of a bicycle shifting hub with a gear selector and a shifting cable assembly according to the invention.

In FIGS. 1 to 10, a shifting cable is designated 1, whereas 2 indicates a small pull chain connection to the hub, see FIG. 12, to be shifted. 3 designates the specially designed connection or male coupling unit part on the small pull chain 2. A connection part differing from the connection part 3 in construction is designated 4 note FIG. 8. The housing or female coupling unit, which forms part of every shifting cable connection assembly and the design of which may differ, is generally designated 5 in FIG. 1. In the representations of the constructional forms according to the invention, there engages in the housing 5, at the top in the drawing position, the end of a pulling member or shifting cable 1, which is fixedly connected to the housing.

Figure 1:
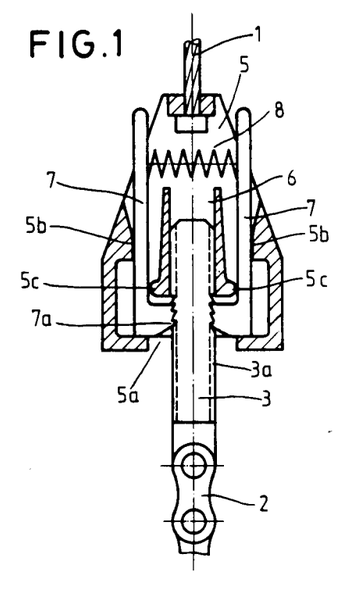
FIG. 1 shows a connection element with a symmetrical detent element in a pressure die-casting construction.

In detail, the exemplified embodiment of FIG. 1 shows a housing 5, in which the shifting cable 1 engages at the top in the figure. The housing 5, on which the cable acts, is approximately box-shaped in its basic shape and its width is reduced at the top and has, opposite to the cable inlet, a passage port 5a, through which the connection part 3 of the small pull chain 2 for the bicycle gear shift projects into a receiving channel or encircling seat 6, which is fixed to the housing, and is held therein by means of an engaging member in the form of symmetrically arranged locking means or detent straps 7. These detent straps 7 co-operate with the inserted connection part or male coupling unit 3 by means of their counter toothing 7a, which connection part, for example in the form of a pin with a rectangular cross section, is provided with locking detent notches or detent grooves 3a which are distributed over the length thereof and are transverse to the longitudinal axis. The detent straps 7 are arranged opposite to each other and are subjected to the action of an expanding compression spring 8. As abutments for the detent straps 7, there are provided in the housing 5 limit stops 5b, on the one hand, and rocker bearings 5c, on the other hand. The afore-described housing 5 with the installed elements, which are fixed to the housing, is expediently produced as a pressure die-casting.

In the operational condition shown in FIG. 1, the connection part 3, which has been placed telescopically through the opening 5a, is held at the end of the pull chain 2 by the detent teeth 7a along the spring-loaded detent straps 7. The interlocking of the connection part inserted telescopically into the connection element is initiated and then maintained by the constantly acting spring force. For the re-tensioning of the shifting cable arrangement, which may become necessary, the connection part 3 and the housing 5 are merely pushed further one into the other. The resilient straps 7 will then engage, without any manual operation, into the next detent notch 3a on the connection part 3. Only for a release operation, for the purpose of removing the connection part, are the detent straps 7 compressed by hand at the releasing means 7c against the tension exerted by the spring 8, thus allowing the engaging connection to be released. The connection part 3 is disconnected in this simple manner for being removed from the female coupling unit or housing 5.

Figure 2:
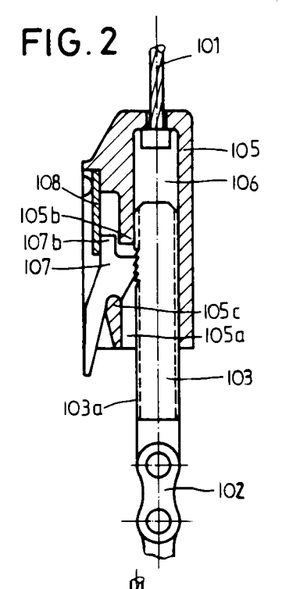
FIG. 2 shows a connection element with only one detent element, also in a pressure die-casting construction.

Another constructional form of a shifting cable connection, which is both insertable and releasable, according to the invention is shown in FIG. 2. In this constructional form, a housing 105 with an approximately rectangular cross section receives in its upper zone the end of the shifting cable 101, whilst there has been inserted into a lower housing opening 105a the connection piece 103 of a gear shift cable 102 as far as is necessary for providing a sufficient tension of the shifting cable. The connection piece 103, which is provided with detent notches or detent grooves 103a, is held in this position by means of an engaging element in the form of a detent lever 107 which is pivotally held in the housing 105 by means of a rocker bearing 105c and, being subjected to the action of a spring 108 which is designed as a leaf spring herein, engages with its detent teeth 107a with the detent grooves 103a in the inserted connection part 103. Here, too, the connection part 103 is advantageously designed as a pin with a rectangular cross section. After the connection part 103 has been inserted into the seat 106 of the housing 105, interlocking is initiated by the force of the leaf spring 108 acting on the detent lever 107 and is maintained by self-intensification when tension in the cable arises. This causes the detent lever 107 to be pressed against the connection part 103. With the connection released, the detent lever 107 is placed, with a cam 107b provided above the detent notches 107a, against the wall 105b of the housing 105 and is in this way in its end position.

For the manual release of the connection part from the housing 105, the detent lever 107 is pivoted against the tension exerted by the leaf spring 108 and is in this way disengaged from the detent grooves 103a. The detenting engagement as such is initiated, following the introduction of the connection part 103, by a relatively low spring force and, with the commencing tension from the shifting cable 101, is held by self-intensification which is brought about on account of the special geometrical position of the mounting and engagement of the detent lever 107.

This constructional form of a shifting cable connection assembly, too, is advantageously produced as a pressure die-casting.

Figure 3:
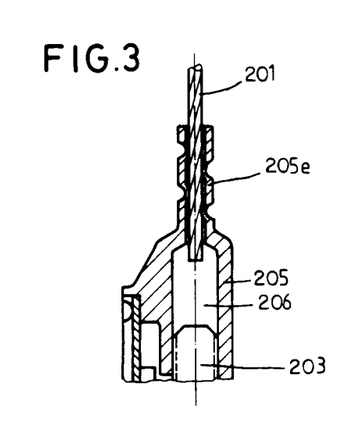
FIG. 3 shows the connection element of FIG. 2 with a directly fastened cable.

FIG. 3 shows, in respect of the afore-described example of FIG. 2, as a detail a construction variant where the shifting cable 201 is directly fastened to the top of the housing 205, namely by clamping. There is discernible the sleeve-shaped lug 205e which is integrally formed with the housing 205 and in which the end of the shifting cable 1 is fastened by clamping.

Figure 4:
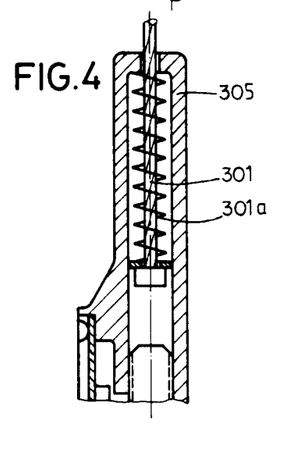
FIG. 4 shows the element of FIG. 2 with a pre-selection spring which has been inserted in the fastening of the cable end in the housing.

FIG. 4 shows, in respect of the exemplified embodiment of FIG. 2, a different arrangement of the shifting cable 301 in the housing 305. Herein, the end of the shifting cable 301 is arranged in the top of the housing 305 with the interposition of a helical spring 301a which can be subjected to pressure. This compression spring 301a can assume the function of a pre-selection spring for storing at least one gear of the shifting system which has been selected but not yet been changed. For this design, the housing 305 has been lengthened by a certain dimension, compared to the housing shown in the example of FIG. 2, in its upper zone in the manner of a sleeve. This extension serves for receiving the spring element 301a which abuts the end of the shifting cable 1 provided with a plate and, on the other hand, is supported on the inner end of the housing lug. For the rest, this shifting cable connection assembly is designed as shown, by way of example, in FIG. 2.

Figure 5:
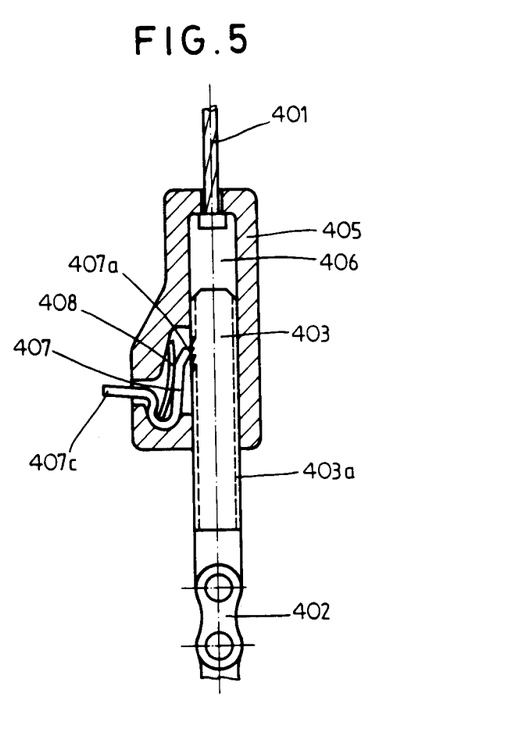
FIG. 5 shows a constructional form with a locking member in the form of a spring-loaded claw.
Figure 13:
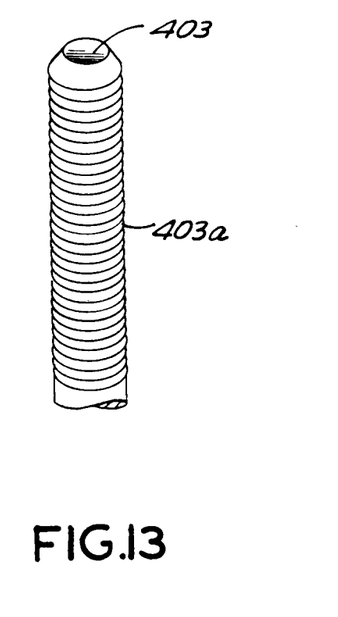
FIG. 13 shows a connection member with a round transverse section.

In FIG. 5 there is shown a constructional form of a shifting cable connection assembly which is a modification of the example of FIG. 2 and wherein a shifting cable 401 also engages in a pressure die-cast housing 405, on the one hand, and in which the connection part 403 of a small shifting chain 402 is received, on the other hand. Here, too, the connection part 403 is inserted into the housing seat 406 until a sufficient tension of the shifting cable system is reached. The interlocking of the connection part 403 in the housing 405 occurs fully automatically. For this purpose, there is pivotally mounted in a trough a detent member in the form of an approximately stirrup-shaped claw 407 which, with one end that is designed as a detent tooth 407a, engages in the detent grooves or detent notches 403a of the connection part 403 under the action of a spring 408 which is designed as a leaf spring and comes to bear against the housing pocket and, on the other hand, keeps the claw 407 in the engaged position. For releasing the cable connection, there is provided on the claw 407 a handle 407c which projects from the housing and with the aid of which the locking element can be swung out of engagement against the leaf spring 408. The connection part 403 can be a round pin-like member with circumferentially extending detent notches or teeth 403a, note FIG. 13.

Figure 6:
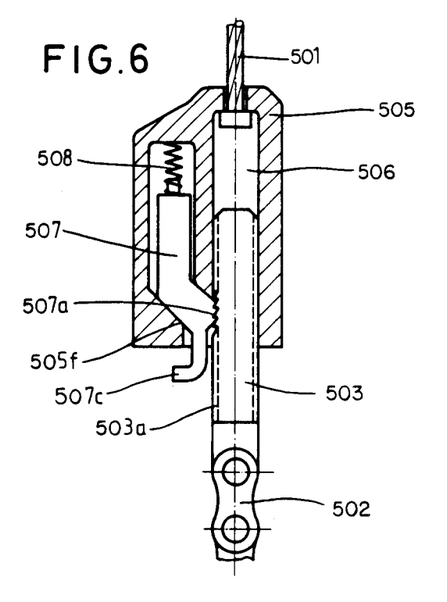
FIG. 6 shows a sectional view of another connection element, also in a pressure die-casting construction.

In FIG. 6 there is shown a modified constructional form of the example of FIG. 2, also designed as a pressure die-casting. An approximately prismatic housing 505 is fixedly connected to a shifting cable 501 at the top, whilst in the inside of the housing 505 there is provided a seat 506 for a shifting chain 502 connection part 503 which is insertable from the bottom. The connection part 503 is slidingly supported on every side in the housing seat 506. Laterally on the housing 505 there is arranged, in an integrally formed zone, an engaging member in the form of a slide 507 which can co-operate in the locking sense with the detent grooves 503a of the inserted connection part 503 by means of an arrangement of detent teeth 507a by engaging through a window-like opening in the housing 505. For this purpose, the slide 507 is guided slidingly and parallel to the seat 506 and is subjected constantly to the action of a compression spring 508 which acts on the slide in the downward direction, causing it to be constantly pressed in its guidance against the detent elements 503a of the connection part 503 by means of an inclined plane 505f. Whilst the slide 507 is disengaged towards the top during the introduction of the connection part 503 into the seat 506, there comes about a self-intensifying pressure force on the part of this slide 507, with its detent teeth 507a, on the detent elements 503a on the connection part 503 when a cable tension occurs in the system. For the release of the afore-described slide 507, i.e. the engagement, there serves a handle 507c which projects from the housing 505 and is provided on the slide 507.

Figure 7:
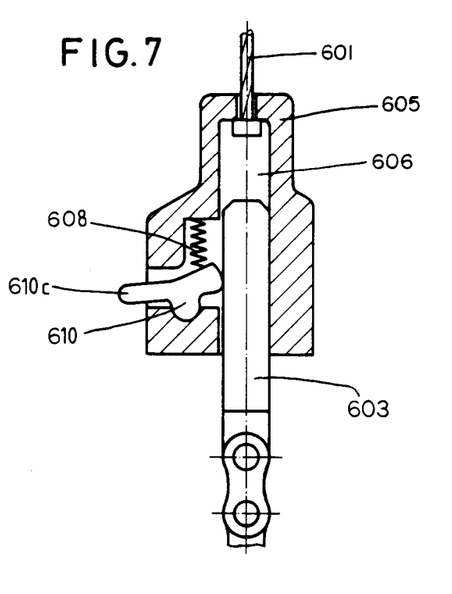
FIG. 7 shows a different constructional form of a connection element, also in a pressure diecasting construction.

In FIG. 7 there is finally shown a constructional form of a connection assembly for a shifting cable according to the invention wherein the shifting cable 601 is again fastened in the housing 605 which, for its part, receives in a seat 606 a connection part 603 so that it is supported on every side. The housing 605 is expediently produced as a pressure die-casting.

The inserted connection part 603 is subjected to the frictional action of a clamping lever 610 which is mounted in a lug on the housing 605 and, under the action of a compression spring 608, constantly abuts one side surface of the connection part 603 which, herein too, has a rectangular cross section. This engagement connection can be established in a simple manner by the insertion of the connection part 603 into the seat 606 of the housing 605 and results in a frictional self-locking connection. For the release of the connection part from the seat 606, all that is necessary is to pivot the clamping lever 610 out of engagement by means of the handle 610c against the tension of the spring 608.

Figures 8, 9:
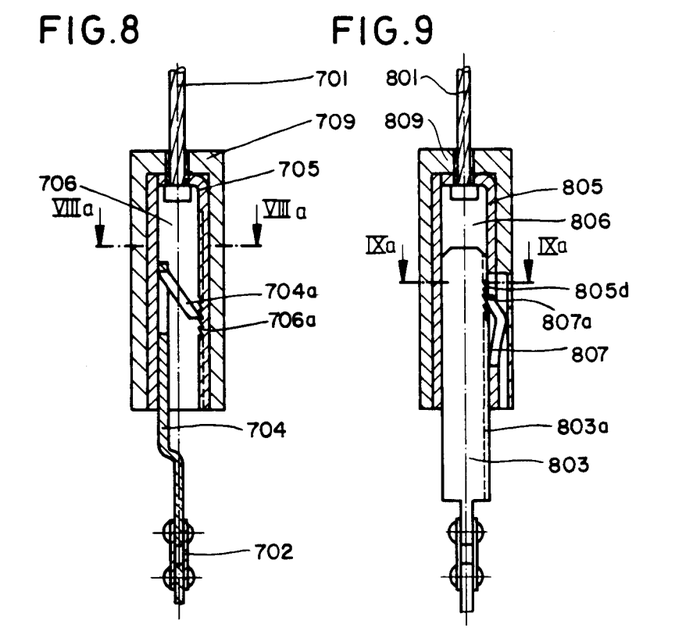
FIG. 8 shows a different constructional form of a connection element in a sheet-metal construction.
FIG. 9 shows a modified constructional form of a connection element in a sheet-metal construction.
Figure 8A:
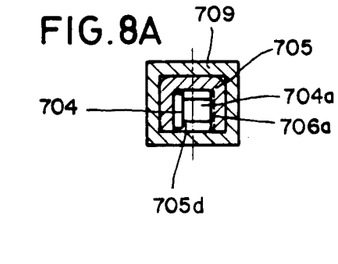
FIG. 8a shows a sectional view of the constructional form of FIG. 8.

Another constructional form of a connection assembly according to the invention for the shifting cable is shown in FIG. 8. There is discernible a housing 705, approximately in the shape of a prism (see FIG. 8a), in which the shifting cable 701 is fastened at the top. A cap-like part 709, which can be slid over, engages slidingly over this housing 705. The interior of the housing 705 is designed as a seat 706 for a connection part which, in this exemplified embodiment, is developed as a plug-in part, which is flat in its basic shape, on a shifting cable chain 702, which part comprises a resilient straddling part 704a. With the latter the plug-in part 704 comes into engagement with an arrangement of detent teeth 706a which extend over the entire inner length of the seat 706 within the housing 705. The cap-like union part 709 engages over the housing 705 in a bell-like and tight manner and in this way shuts one side 705d of the housing 705, which side is open according to the invention, so that the plug-in part 704 is supported on every side, as FIG. 8a reveals, in particular. The function of this exemplified embodiment is the same as that of the afore-described exemplified embodiments. The plug-in part 704 at the end of the connection chain 702 can be introduced into the seat 706 until the shifting cable 701 is sufficiently tensioned and is interlocked therein in a self-locking manner. For the release of this plug-in connection, the union part 709 is lifted off and the plug-in part 704 with its locking tab part 704a is exposed in this way, that is to say it can be removed laterally from the interlock 706a through the housing opening 5d. In this development, it is also possible to produce the straddling tab 704a as a separate part and to connect it to the plug-in part 704, for example for riveting.

Figure 9A:
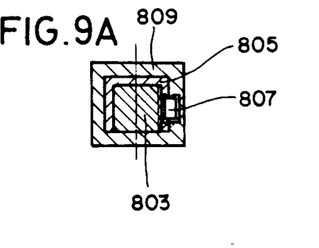
FIG. 9a shows a sectional view of the constructional form of FIG. 9.

Another exemplified embodiment of a shifting cable connection assembly according to the invention is shown in FIGS. 9 and 9a. Like the exemplified embodiment of FIG. 8, this constructional form is designed as a sheet-metal construction. There is provided a housing 805, in which the shifting cable 801 ends in the upper zone. The housing forms inside a seat 806 for a connection part 803 which has the already described rectangular cross section (see FIG. 9a). The housing 805 has laterally a window-like opening 805d which extends in the longitudinal direction and in which a detent part 807 of a resilient material is arranged as the engaging member and is held in its engaged position by a union part 809 which tightly engages over the housing 805. The detent part 807, with its engaging edge 807a at the top, is engaged with the detent teeth 803a along the inserted connection part 803 and retains the connection part in the position brought about by manual insertion.

This plug-in connection can be released in that the over-engaging cap part 809 is axially displaced with respect to the housing 805, allowing the detent part 807, which is laterally arranged in the window 805d, to be moved outwardly and to be disengaged in this way from the detent elements 803a on the connection part 803. It may also be expedient to produce the housing 805 and the detent part 807 integrally, that is to say the detent part 807 is then formed as a stamped resilient tab.

Figure 10:
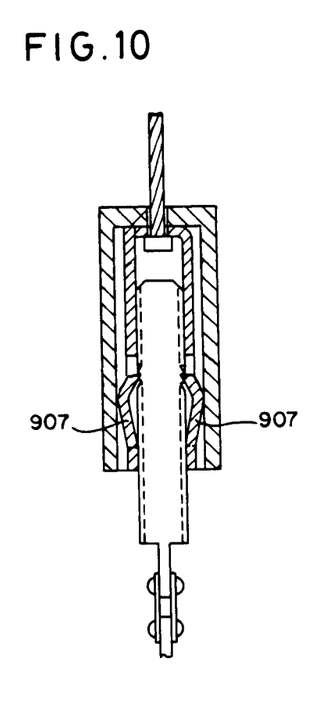
FIG. 10 shows a sectional view of a constructional form with symmetrical detent elements, in a sheet-metal construction.

In FIG. 10 there is shown another constructional form which equals in principle the constructional form of FIG. 9 but wherein instead of one detent part 807 there are provided two detent parts 907 which are opposite to each other. The mode of operation and handling of this connection assembly is the same as that which has been explained in detail in connection with the exemplified embodiment of FIG. 9.

Figure 11:
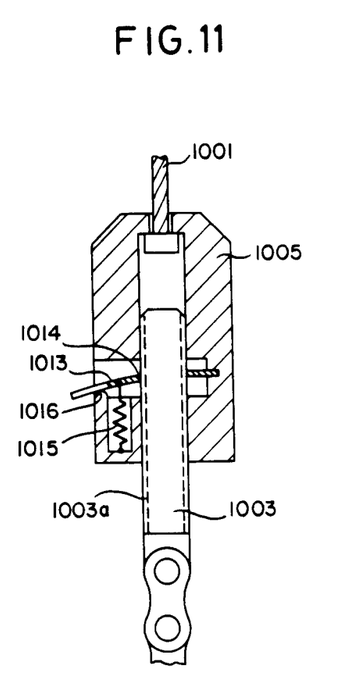
FIG. 11 shows a sectional view of a constructional form with a spring locking disc.

In another constructional form of a shifting cable connection assembly, as shown in FIG. 11, the housing 1005 is provided, for the pluggable reception of the connection part 1003, with a spring locking disc 1013 which is arranged so as to be inclined to the axis of this seat and which is tiltable and is penetrated by the plugged-in connection part 1013 in a relatively narrow hole 1014. The spring locking disc 1013 can be raised, against the tension of a return spring 1015, to a plane that is approximately perpendicular to the axis of the connection part 1003, thus allowing the connection part 1003 to be easily inserted. As a result of the constant tension of the return spring 1015, the spring locking disc 1013, with the connection part inserted, is at once positioned, in accordance with the bearing surface 1016 provided in the housing, so as to be inclined again to the axis thereof, and there is provided by the hole edge 1014 a detented connection to the detents 1003a provided on the connection part, over the length thereof, this connection being intensified by the tension in the cable 1001. A separation of this connection is possible in a simple manner in that, merely by raising the spring locking disc 1013 against the tension of the return spring 1015 into a plane that is approximately perpendicular to the connection part 1003, the detented connection is released and it is possible to remove the connection part 1003.

In FIG. 12, a bicycle shifting hub is designated 17. Within this hub 17, there is diagrammatically shown a speed shift member or shifting element 18 which is biassed by a strong spring 19 to a basic position determined by a stop 20. The shifting element 18 can be adjusted from a manually operable switch unit (21) or gear shifter 21 via a flexible pulling member assembly consisting of a cable 1 and the chain 2, against the action of the spring 19. The chain is connected to the cable 1 via one of the detent connections of FIGS. 1 to 11. The gear shifter 21, the hub 17 and the deflection pulley 22 are fastened to the bicycle frame 23.

The afore-described constructional forms of an assembly for the connection of shifting cable parts, as developed according to the invention, are based on the conception that, during the joining thereof, there is already attained by the tensioning of the shifting cable by hand the adjustment that is correct tensionwise because the cable has been detented from the manual shifter and there acts on the connection piece as the counter-part a strong spring from the shifting system in such a way that the connection part itself, and the chain or the like connected thereto respectively, can only be pulled out against the tension of this spring with a great expenditure of strength.

As emerges from the above description of the exemplified embodiments, the connection according to the invention between the shifting cable and the hub connection part comprises a relatively simple housing with functionally reliable elements, namely the cable from the shifter, the connection part on the small pull chain from the hub, the engaging member (detent lever) and possibly a compression spring. As described, interlocking is initiated and maintained by spring force or there is initially effected the initiation by spring loading and then a self-locking or self-intensification of the previously effected interlocking commences in accordance with the cable tension in the system. Like the closing of the connection by merely inserting the connection part into the correspondingly designed seat in the housing of the connection piece, the release of the connection is possible by hand in a simple manner, as described above. The connection assembly for a shifting cable in the design according to the invention can be used both for the shifting system of a hub gearing and for a positioned derailleur system and is equally suitable for the use of a cord cable and a wire cable.

The housing of the connection assembly may be produced not only as a metal pressure die-casting but equally advantageously as a plastics material injection moulding.

The connection part to be inserted may be provided, apart from an angular cross section, with a round cross section and may have detent notches, which extend all around, each taking the form of a saw tooth, whose steep flank is directed towards the pull direction.

Furthermore, the connection part, as a stamping, may have a flat cross section, the detent notches being provided on the narrow sides of the connection part.

We claim:

1. A speed change system for a bicycle or the like comprising:
  (1) a speed shift member (18), said speed shift member (18) being movable through a plurality of shift member positions responsible for a corresponding plurality of gear ratios;
  (2) abutment means (20) defining a basic shift member position of said speed shift member (18);
  (3) shift member biasing means (19) urging said speed shift member (18) towards said basic shift member position;
  (4) a manually operable switch unit (21) including a switch handle movable through a plurality of handle positions corresponding to said shift member positions, said handle positions including a basic handle position corresponding to said basic shift member position;
  (5) a flexible pulling member assembly (1, 2) transmitting motion from said switch handle of said switch unit (21) to said shift member, said pulling member assembly (1, 2) including a first pulling member (1) connected to said switch unit (21) and a second pulling member (2) connected to said speed shift member (18);
  (6) a coupling assembly interconnecting said first pulling member (1) and said second pulling member (2), said coupling assembly including
    (a) a female coupling unit (5) connected with one of said first and said second pulling members (1, 2) and being provided with an elongated receiving channel (6) having a rectilinear axis extending in the elongated direction and a terminal opening extending transversely of the axis;
    (b) a male coupling unit connected with the other (2) of said first and second pulling members (1, 2) and being provided with a male coupling member (3) telescopically movable through the terminal opening into and slidably movable within said receiving channel (6) in the direction of the rectilinear axis thereof;
    (c) locking means (7, 3a) locking said male coupling member (3) within said receiving channel (6);
    (d) manually operable lock releasing means (7c) in operative engagement with said locking means for releasing said locking means (7, 3a);

said female coupling unit (5) comprising a housing elongated in the direction of said elongated receiving channel and laterally enclosing the receiving channel in the elongated direction, said housing having a first end and a second end spaced apart in the elongated direction with said second end forming said terminal opening, said male coupling member (3) being telescopically and rectilinearly movable through the terminal opening into said receiving channel (6) along said axis, said male coupling member being axially slidably insertable into said receiving channel without manually operating said lock releasing means, and said male coupling member (3) being movable out of said receiving channel toward the terminal opening of said receiving channel (6) only after manually releasing said lock releasing means (7c), said flexible pulling member assembly (1, 2) being tensioned between said speed shift member and said switch unit when said male coupling member (3) is moved into said receiving channel (6) and locked by said locking means (7, 3a), said shift member biasing means (19) acting on said speed shift member being of such strength in said basic shift member position of said speed shift member (18) that a considerable expenditure of strength is required acting on said switch unit through said coupling assembly from said first pulling member to said second pulling member for overcoming said shift member biasing means and displacing said speed shift member (18), said locking means (3, 7a) comprising a plurality of teeth (3a) along said axis on said male coupling member (3) and one single teeth engagement member (7) on said female coupling unit (5), said teeth engagement member (7) being mounted within said housing of said female coupling unit (5) for displacement into and out of engagement with said teeth (3a), a biasing spring (8) being housed wholly within said housing of said female coupling unit (5) and biasing said teeth engagement member (7) into engagement with said teeth (3a), said lock releasing means in engagement with said teeth engagement member (7) being provided with an unlocking handle (7c) extending through an opening in said housing outwardly of said housing, said teeth engagement member (7) and said plurality of teeth (3a) acting as a one-way pawl-ratchet system allowing free inward movement of said male coupling member (3) into said receiving channel (6) and locking outward movement of said male coupling member (3) out of said receiving channel (7), a pocket being shaped within the housing of said female coupling unit (5), said pocket being open towards said receiving channel (6) and substantially closed to the exterior of said housing, said pocket receiving said teeth engagement member (7) and said biasing spring (8) with said handle extending outwardly from said pocket through the opening in said housing, said teeth engagement member (7) being established by a bent material strip (7), said bent material strip (7) having a first end (7a) for engagement with said teeth (3a) and a second end (7c) forming said handle (7c), an intermediate section of said bent material strip (7) being cylindrically curved, said cylindrically curved intermediate section being in bearing engagement with a cylindrical concave side face of said pocket, said biasing spring (8) being a leaf spring supported by a further side face of said pocket and acting onto said material strip adjacent the first end (7a) thereof.

2. A speed change system as set forth in claim 1, wherein said female coupling unit (5) is a metal pressure die-casting.

3. A speed change system as set forth in claim 1, wherein said female coupling (5) is a plastics material injection-molding.

4. A speed change system as set forth in claim 1, wherein said male coupling member is an axially elongated rod-like member, having a round cross-section, and said teeth (3a) extend circumferentially completely around said male coupling member.

5. A speed change system as set forth in claim 1, wherein said teeth (3a) have a configuration of saw-teeth.

* * * * *